United States Patent [19]

Ishikawa et al.

[11] Patent Number: 5,706,075
[45] Date of Patent: Jan. 6, 1998

[54] EXPOSURE APPARATUS FOR CONTROLLING THE DURATION OF EXPOSURE OPERATIONS ACCORDING TO COMPENSATED EXPOSURE DATA

[75] Inventors: Masazumi Ishikawa; Tohru Tanibata; Yasutaka Kayama, all of Wakayama, Japan

[73] Assignee: Noritsu Koki Co., Ltd., Wakayama, Japan

[21] Appl. No.: 567,427

[22] Filed: Dec. 5, 1995

[30] Foreign Application Priority Data

Dec. 6, 1994 [JP] Japan .................................. 6-302231

[51] Int. Cl.[6] .................................................. G03B 1/00
[52] U.S. Cl. .................................................. 355/35; 358/302
[58] Field of Search .................................... 355/1, 35, 37, 355/38, 71; 358/298, 302, 519, 296; 347/131, 136

[56] References Cited

U.S. PATENT DOCUMENTS

| | | | |
|---|---|---|---|
| 4,335,399 | 6/1982 | Matsumoto | 358/519 |
| 4,449,153 | 5/1984 | Tschang | 358/296 |
| 4,939,529 | 7/1990 | Kanayama et al. | 358/302 X |
| 4,965,672 | 10/1990 | Duke et al. | 358/298 |

Primary Examiner—Joan H. Pendegrass
Attorney, Agent, or Firm—Wenderoth, Lind & Ponack

[57] ABSTRACT

The present invention provides an apparatus capable of controlling the duration of voltages applied to line exposure elements in proportion to the gray levels of a color to produce a gentle gradation of the color. This is achieved in the present invention by converting exposure data into compensated exposure data in which the duration of the exposure operation is compensated according to predetermined characteristics. The duration of the exposure operation of the exposure device is then controlled according to the compensated exposure data to thereby produce a smooth, high quality gradation of color.

5 Claims, 7 Drawing Sheets

EXPOSURE APPARATUS FOR CONTROLLING THE DURATION OF EXPOSURE OPERATIONS ACCORDING TO COMPENSATED EXPOSURE DATA

BACKGROUND OF THE INVENTION

The present invention relates to an exposure apparatus for use in a photographic printer and more specifically, to a digital exposure apparatus provided with an electronic control shutter such as a line exposure shutter.

Conventional digital exposure apparatuses with line exposure shutters in which each sheet of photosensitive material is moved forward and backward more than one time for exposure to blue, green, and red colors (referred to as B, G, and R hereinafter) in response to the application of corresponding voltages to groups of line exposure elements are well known.

During the exposure operation, each dot is printed in a color determined by exposure data. As the exposure data includes a gray scale, the intensity of exposure light is determined by gray levels of the data.

It is conventionally known to determine the intensity of exposure light by controlling the duration of the application of voltages to the line exposure elements.

If 32 gray levels, for example, are required, the duration voltage applied to the line exposure elements is classified into 32 different modes as shown in Table 1.

Table 1 illustrates some of the gray levels; 0, 1, 2, 4, 8, and 16.

Figure 6:
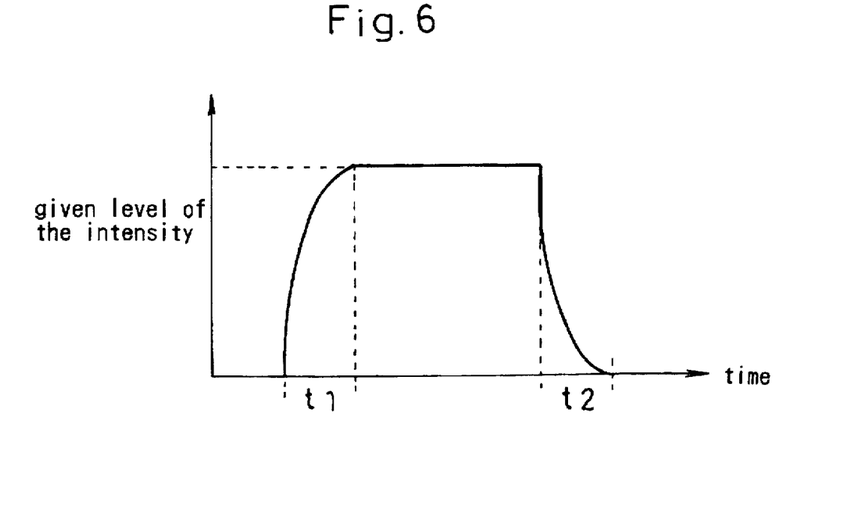
FIG. 6 is a waveform diagram of a PLZT element.
Figure 7:
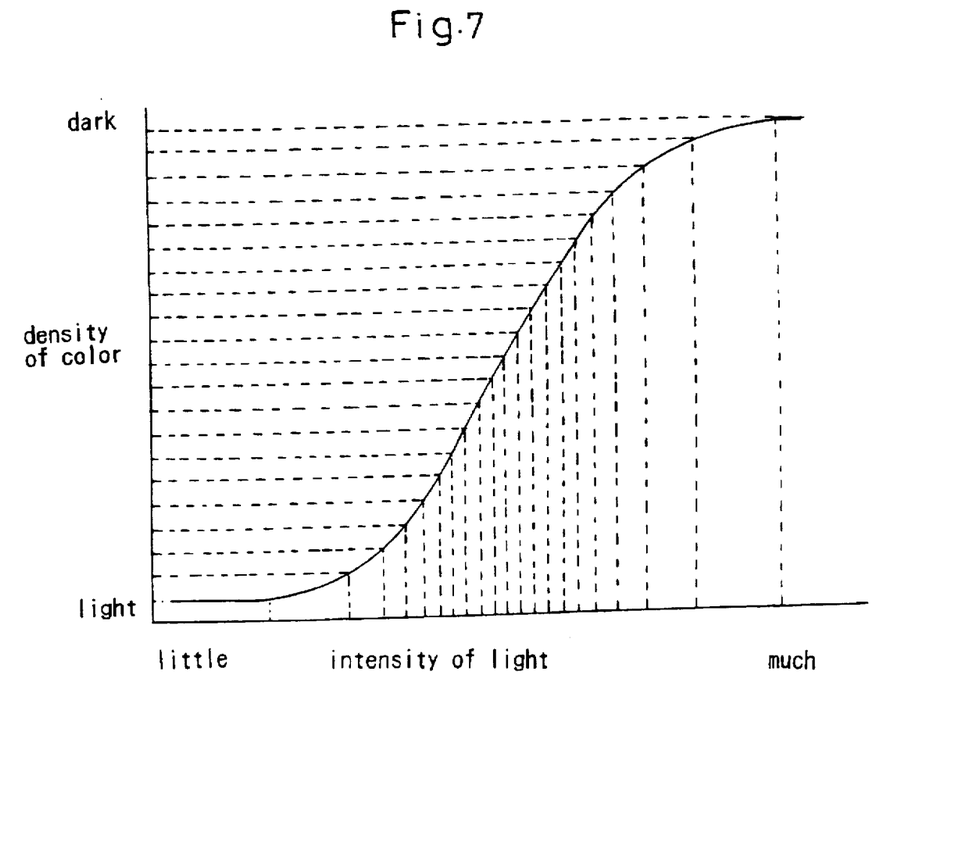
FIG. 7 is a graphic diagram showing a major characteristic of the PLZT element.

However, the duration of the application of a voltage to a corresponding line exposure element includes a rise time t1, from zero to a given level of the intensity after starting the application and a decay time t2, starting when the voltage is interrupted and finishing when the intensity of exposure light is dropped to a disable level, as shown in FIG. 6. Thus, the duration of the application of a voltage to a corresponding line element will hardly be proportional to the intensity of exposure light.

Also, the intensity of exposure light is not directly proportional to the density of a color. It was determined that a two or four times increase in the intensity of light did not cause the color density to increase directly to a two or four times greater level. It is now understood that the quality of gray levels are not increased by controlling the duration of the applied voltages to the line exposure elements in proportion to corresponding data.

It is an object of the present invention to provide an apparatus capable of controlling the duration of the application of voltage to line exposure elements in proportion to the gray levels of a color to produce a gentle gradation of the color.

SUMMARY OF THE INVENTION

In this application, an exposure apparatus responsive to exposure data for controlling a duration of an exposure operation performed by an exposure device to reproduce gradations on a photosensitive material is provided according to the present invention, which comprises: a converter means for converting the exposure data into compensated exposure data in which the duration of the exposure operation is compensated according to predetermined characteristics, the converter means comprising: a conversion table containing the compensated exposure data, wherein the exposure data corresponds to the compensated exposure data, respectively, in the conversion table; a conversion data setting means for setting the compensated exposure data in said conversion table according to the predetermined characteristics; and a reference means for selecting the compensated exposure data from the conversion table in accordance with the exposure data; an exposure controller means for controlling the duration of the exposure operation of the exposure device according to the compensated exposure data selected by the reference means.

Further, an exposure apparatus of the present invention is modified such that the reference means selects a combination of the compensated exposure data from the conversion table in accordance with the exposure data.

Further, an exposure apparatus of the present invention is modified such that the predetermined characteristics of the setting means are desired gray levels which are proportional to the exposure data.

Further, an exposure apparatus of the present invention is modified such that the predetermined characteristics of the setting means are desired intensities of exposure light which are proportional to the exposure data.

Further, an exposure apparatus of the present invention is modified such that the compensated exposure data set in the conversion table includes the exposure data of the duration of the exposure operation with an appropriate delay added for rise and decay times of an exposure light.

It is noted that the data of a compensated duration of exposure action with references to predetermined characteristics is not proportional to the exposure data.

Further, an exposure apparatus of the present invention is modified in which the converter means comprises a conversion tale in which each exposure data refers to the data of a compensated duration of exposure action defined by predetermined characteristics, and a reference means for selecting the data of a compensated duration of exposure action referring to the exposure data in the conversion table.

Further, an exposure apparatus of the present invention is modified in which the converter means comprises a conversion table in which each exposure data refers to the data of a compensated duration of exposure action defined by predetermined characteristics, and a reference means for determining a combination of the data of a compensated duration of exposure action referring to the exposure data in the conversion table.

Further, an exposure apparatus of the present invention is modified in which the converter means comprises a conversion table in which each exposure data refers to the data of a compensated duration of exposure action calculated for reproducing a desired gray level proportional to the exposure data, and a reference means for determining the data of a compensated duration of exposure action referring to the exposure data in the conversion table.

Further, an exposure apparatus of the present invention is modified in which the converter means comprises a conversion table in which each exposure data refers to the data of a compensated duration of exposure action for passing a desired intensity of exposure light proportional to the exposure data, and a reference means for selecting the data of a compensated duration of exposure action referring to the exposure data in the conversion table.

Further, an exposure apparatus of the present invention is modified which further comprises a conversion data setting means for setting the data of the compensated duration of exposure action to a desired length of time in the conversion table.

In the apparatus which is responsive to exposure data for controlling the duration of exposure action of an exposure means to reproduce gradations on a photosensitive material while an intensity of light having been emitted from a light source towards the exposure means, the converter means in response to an exposure data determines a data of the compensated duration of exposure action with reference to predetermined characteristics. The characteristics can thus be utilized to compensate with its optimum settings a delay of the exposure action in the exposure means caused by the rise and decay times and a nonlinear relation between the intensity of exposure light and the density of color, allowing a desired gray level of the exposure data to be correctly reproduced.

Further, the exposure apparatus allows the converter means to include the conversion table in which each exposure data refers to the data of the compensated duration of exposure action defined by predetermined characteristics. The data of the compensated duration of exposure action can hence be determined by the reference means referring to the exposure data in the conversion table, ensuring a correct exposure action to reproduce a desired gray level of the exposure data.

Also, the converter means of the exposure apparatus includes the conversion table in which each exposure data refers to the data of the compensated duration of exposure action defined by a less number of predetermined characteristics. However, an optimum of the data of the compensated duration of exposure action for reproducing a desired gray level can be calculated from its combination referring to the exposure data in the conversion table.

Further, the converter means of the exposure apparatus includes the conversion table in which each exposure data refers to the data of the compensated duration of exposure action calculated for reproducing a desired gray level proportional to the exposure data. Accordingly, the desired gray level will be reproduced corresponding to the exposure data.

Further, the converter means of the exposure apparatus includes the conversion table in which each exposure data refers to the data of the compensated duration of exposure action for passing a desired intensity of exposure light proportional to the exposure data. The desired intensity of exposure light will thus reproduce a correct gray level proportional to the exposure data.

The converter means of the exposure apparatus is associated with the conversion data setting means for setting the data of the compensated duration of exposure action to a desired length of time in the conversion table, hence reproducing a smooth, arbitrary gradation.

DETAILED DESCRIPTION OF THE PREFERRED EMBODIMENT

One embodiment of an exposure apparatus of the present invention installed in a photographic printer will be described referring to the accompanying drawings.

Figure 1:
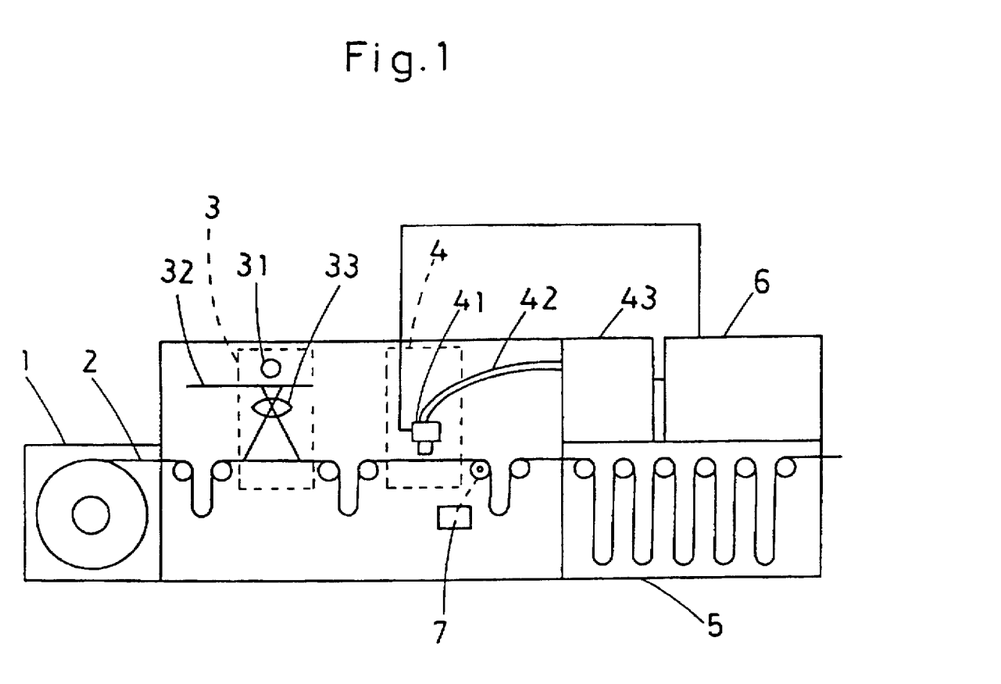
FIG. 1 is an overall schematic view of a photographic printer provided with an exposure apparatus according to the present invention.
Figure 2:
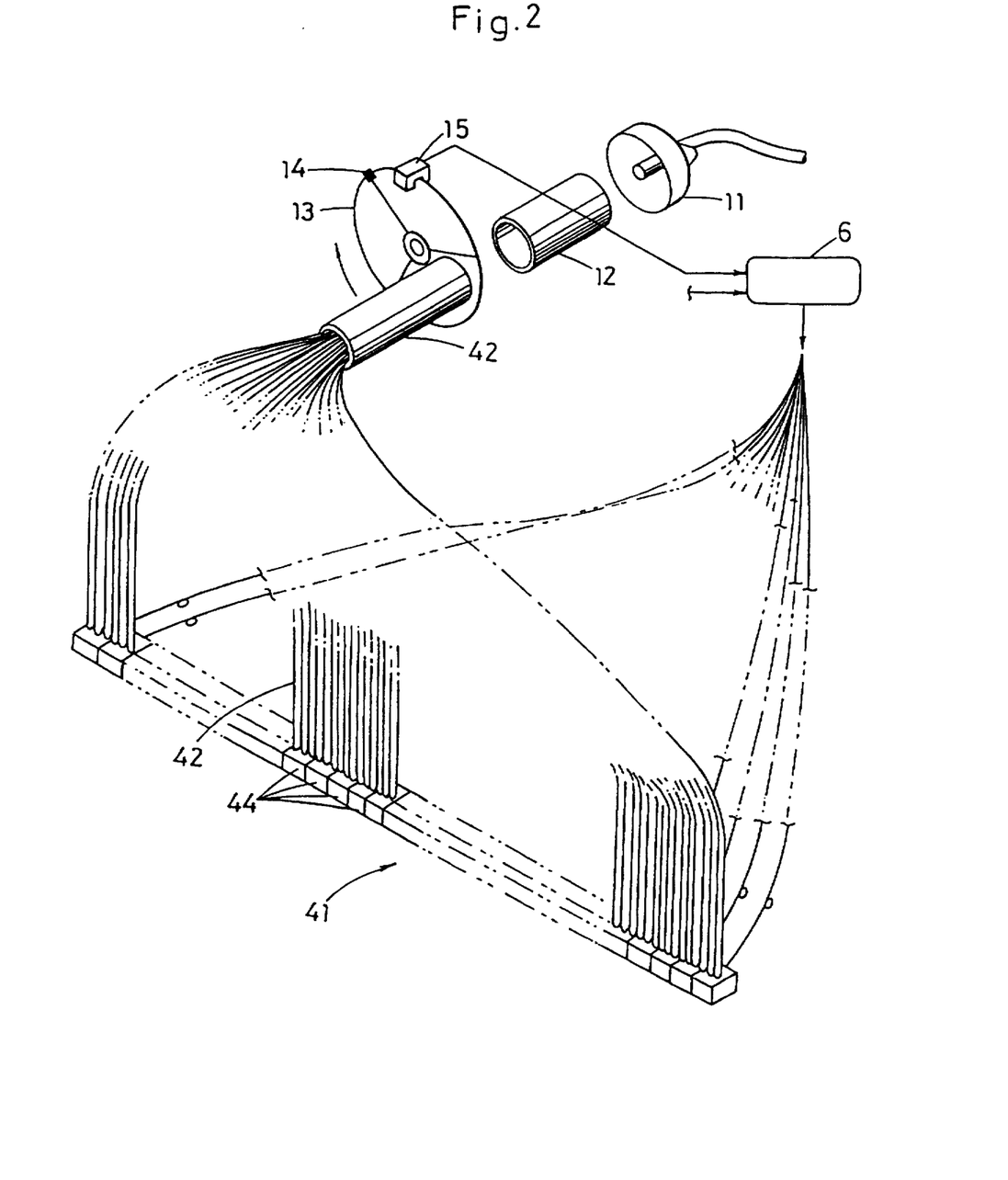
FIG. 2 is a schematic view showing a primary part of the photographic printer.

FIG. 1 is an overall schematic view of the photographic printer and FIG. 2 is a schematic view of a primary part of the photographic printer.

As shown in FIG. 1, the photographic printer is provided with a magazine 1 for supplying a sheet of a photosensitive material or print paper 2, a negative exposure station 3 for exposing the print paper 2 to optical images of a negative film, a line exposure station 4 for exposing the print paper to digital images, a development unit 5 for developing the exposed print paper 2, a line exposure controller unit 6, and a transfer mechanism 7 for conveying the print paper 2 in a lengthwise fashion by a frame-by-frame basis and a dot-by-dot basis.

Figure 4:
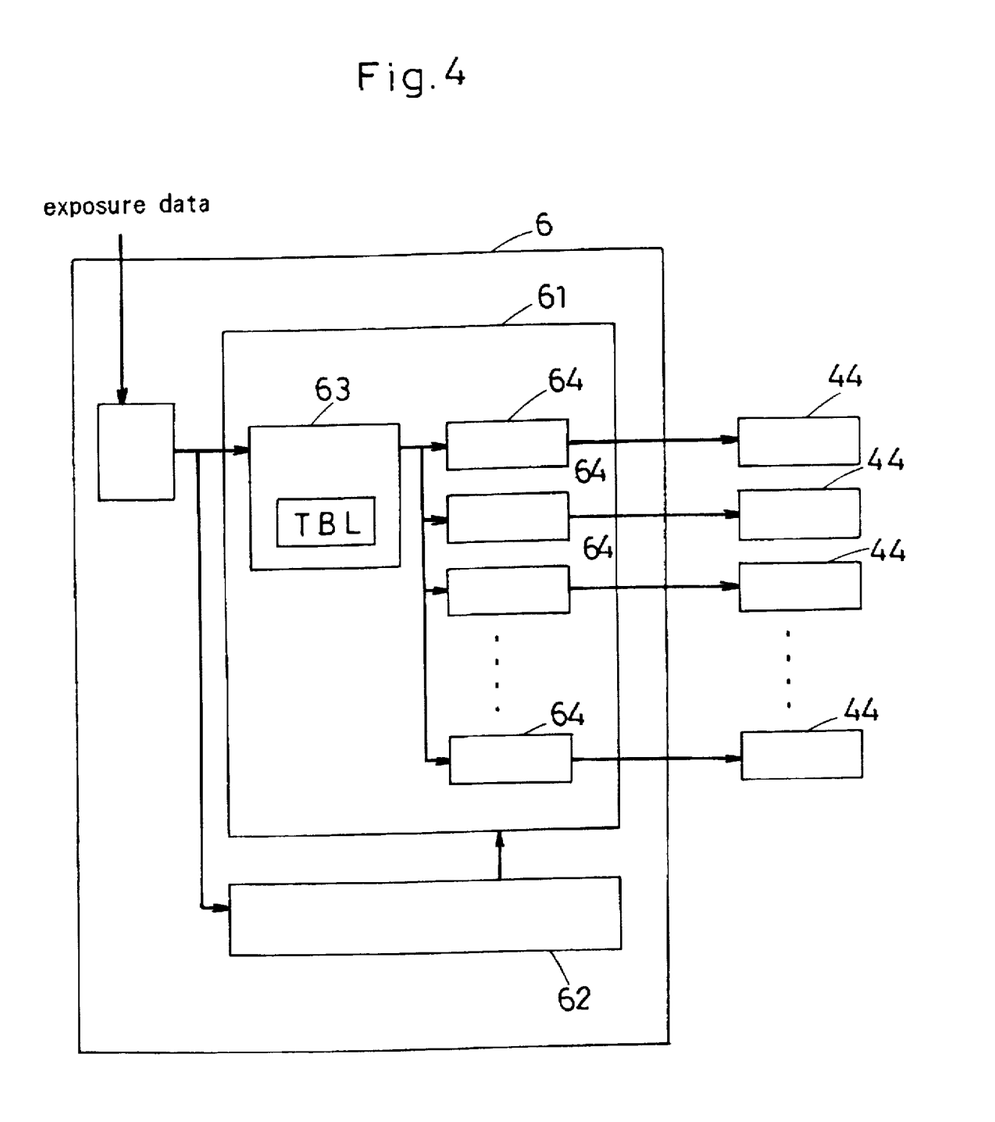
FIG. 4 is a block diagram of a primary part of the photographic printer.

The line exposure controller unit 6 comprises a time controller 61 for controlling the duration of exposure in the line exposure station 4, a voltage controller 62 for controlling the applying voltage in response to the location of a disk 13, and a transfer controller for controlling the transfer mechanism 7 for conveying movements at given times, as shown in FIG. 4.

The time controller 61 includes a converter means or circuit 63 and a PLZT controller means or circuit 64.

The converter circuit 63 has data for conversion as shown in Table 2 in which the gray levels D are defined by applying durations T of a nonlinear function. The gray level data D are determined so that they are proportional to the density of color. The converter circuit 63 is provided with a conversion data setting means 65 for setting the data in Table 2.

The PLZT controller circuit 64 is provided for applying a given voltage to a group of PLZT elements for the duration T.

For example, the gray level D=1 in Table 2 is determined by a duration T=t, an intensity of exposure light S=s, and a density of color V=v and if D=2 is requested, the voltage is applied for a duration t2 to have a density v2=2xv. The duration T and the exposure light intensity S are nonlinear functions of the gray level D so that a gray level proportional to the density of color is produced when light of the intensity S has been irradiated for the duration T.

If a different type of the photosensitive material of the print paper 2 is used, the duration data for voltage application in Table 2 are modified corresponding to the particular type of material by the conversion data setting means 65. This allows the color density to be consistently produced corresponding to its gray level data, yielding a precise tone.

In the negative exposure station 3, an image on the negative film 32 is projected by irradiation of light from a lamp 31 and focused by a lens 33 on to the print paper 2.

As shown in FIGS. 1 and 2, the print paper 2 is then exposed in the line exposure station 4 to an optical pattern of dots of digital data which has been scanned and recorded with a scanner or produced by an electronic apparatus such as a computer. The digital data consists mainly of the R, G, and B separate color data and the gray level data of each color. The digital data may be introduced in the form of a serial signal to the line exposure controller 6 where it is converted into a parallel data applied to each PLZT element. The parallel data consists of a color data and a gray level data. The color data is fed to the voltage controller 62 and the gray level data is transferred to the time controller 61.

The line exposure station 4 comprises an exposure means or PLZT shutter 41 having rows of PLZT elements 44, each row extending widthwise in relation to the print paper 2, a bundle of optical fibers 42 coupled at one end to the PLZT elements 44 of the PLZT shutter 41 respectively, and a PLZT light source 43 for emitting B, G, and R modes of exposure light through the optical fibers 42.

It should be understood that the ratio of PLZT elements 44 and the optical fibers 42 is not limited to 1:1.

An intensity of light emitted from the lamp 11 is directed through a mirror tunnel 12 to the disk 13 which comprises three, R, B, and G, color filters, each extending through 120 degrees. The R, B, and G modes of light passed through the disk 13 are then transmitted through the optical fibers 42 to corresponding groups of the PLZT elements 44.

The PLZT elements 44 are energized with a given amplitude of voltage which is determined by the voltage controller 62 in response to the location (B, G, R modes) of the disk 13 which is controlled by the gray level data which times the rotation of the disk. As the result, a desired mode of light having a specific wavelength is allowed to pass from the optical fibers 42 to the print paper 2.

The timing of rotation of the disk 13 is measured by a sensor 15 reading a mark 14 on the disk 13. The three filters of the disk 13 are arranged so that the B, G, and R modes are positioned in order across an optical path of the bundle of the optical fibers 42. The mark 14 is located between the B and G color filters and the sensor 15 is disposed 120 degrees out of phase with the optical path of the fibers 42.

Figure 5:
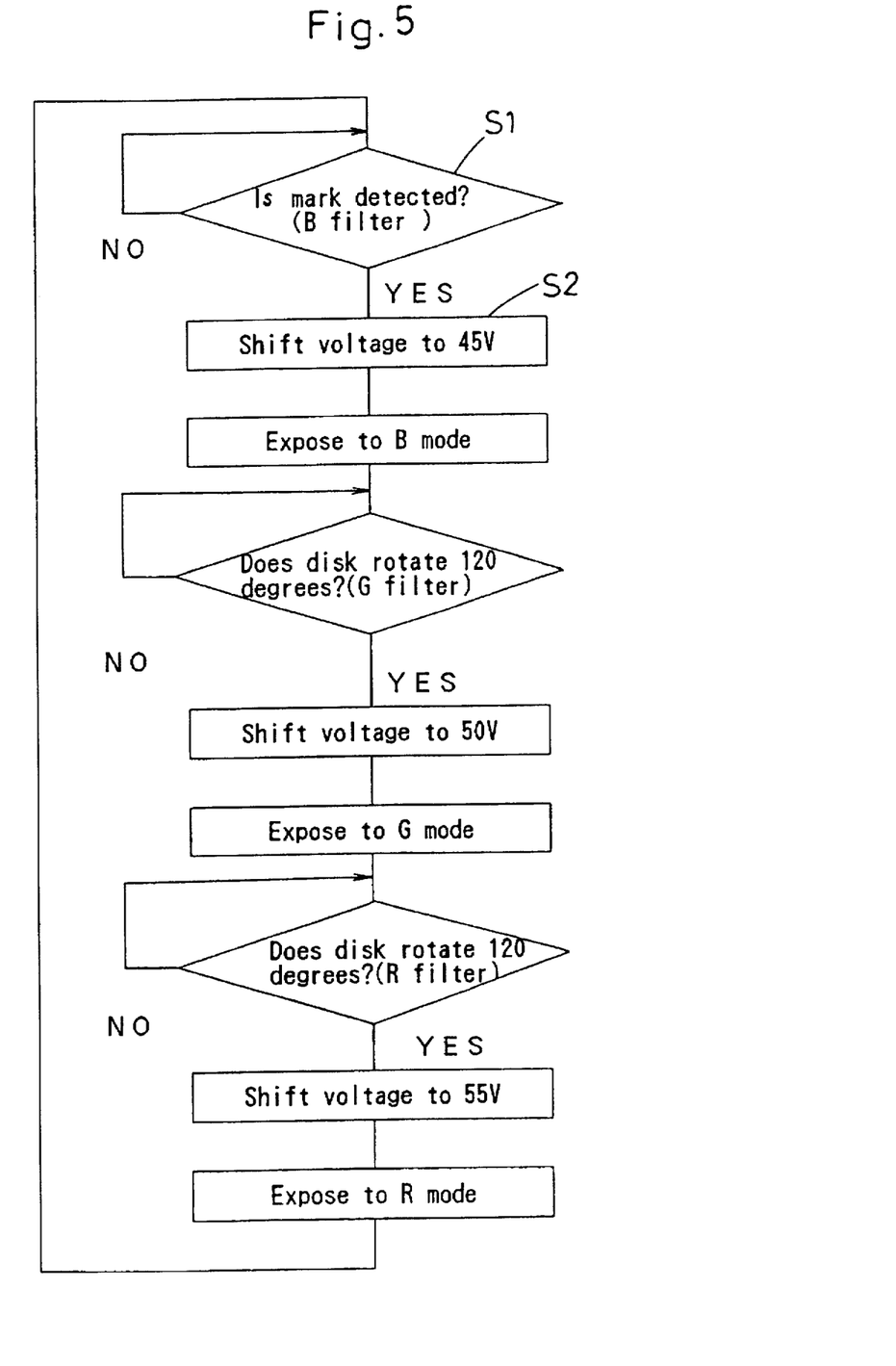
FIG. 5 is a flow chart showing the exposure process.

The timing of exposure to the B, G, and R modes of light will be explained referring to FIGS. 2, 3, and 5.

Figures 3A, 3B, 3C:
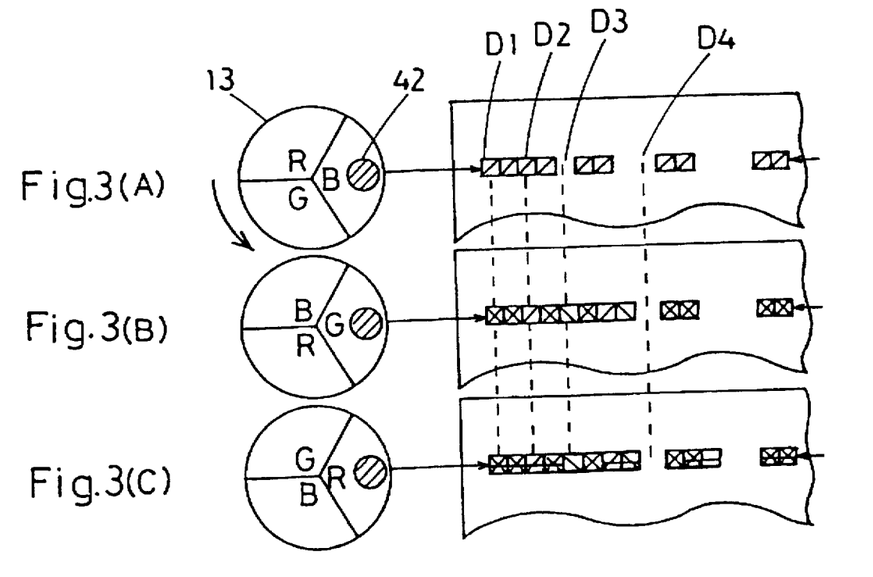
FIG. 3 is a diagram explaining steps of the exposure process.

It is assumed that the exposure operation starts with Step S1 where the mark 14 is detected by the sensor 15. The B mode filter rotates through 120 degrees from the mark and the voltage applied to a target group of the PLZT elements 44 is shifted to 45 volts of a B mode amplitude by the voltage controller 62 in the line exposure controller unit at Step S2. When the exposure to an original pattern of dots of the B mode light has been conducted for a duration proportional to a gray level of its original color pattern data, a row of print dots D1, D2 ... appear at the gray level on the print paper 2, as shown in FIG. 3(A).

It is judged that when the disk 13 has rotated another 120 degrees after detection of the mark 14, the filter is turned to the G color mode. Then, the voltage is shifted to 50 volts of a G mode amplitude by the voltage controller 62 in the line exposure controller unit 6 and is applied to another group of the PLZT elements 44 for a duration proportional to the gray level of an original color pattern data. Accordingly, the pattern of dots D1, D3 ... appear on the print paper 2 representing the gray level of its original color pattern as shown in FIG. 3(B).

Equally, when the disk 13 has rotated 120 degrees further, the filter is turned to the R color mode. Then, the voltage is shifted to 55 volts of an R mode amplitude by the voltage controller 62 in the line exposure controller unit 6 and is applied to a further group of the PLZT elements 44 for a duration proportional to the gray level of an original color pattern. Accordingly, the pattern of R color dots D1 ... appear at the gray level on the print paper 2 as shown in FIG. 3(C).

During the above exposure operation, the dot D1 is exposed to three, B, G, and R, colors of light, the dot D2 is exposed to two, B and R colors, the dot D3 is exposed to a G color, and the dot D4 remains unexposed to any color.

The exposure duration for each dot is determined by the time controller 61 according to the conversion data listed in Table 2, whereby the gray level of its color pattern data will be produced correctly.

The duration of the voltage applied to the PLZT elements of each color is controlled so that the color density is proportional to a gray level data, thus reproducing a desired gradation of color.

During the exposure operation of the B, G, and R colors, the print paper 2 remains stationary, thus allowing a widthwise extending row of dots to be printed. After a series of the steps shown in FIG. 5 is completed, the print paper 2 is then advanced by a distance of one dot size.

Figures 3D, 3E, 3F:
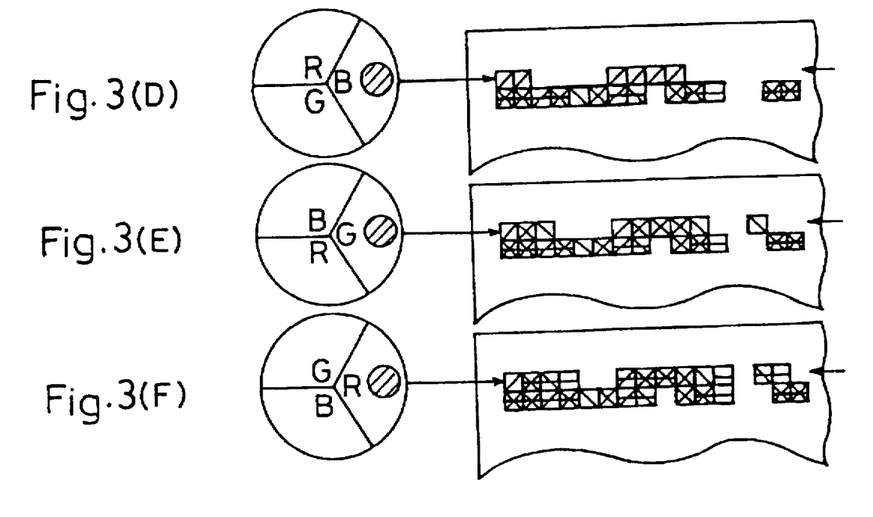

The exposure position on the print paper 2 is now as shown in FIGS. 3 (D) to 3 (F).

The same action is then repeated with another group of B, G, and R data being introduced in synchronization with the rotating action of the disk 13, producing another row of dots.

Similarly, the print paper 2 is advanced again by the one dot distance upon completion of the exposure operation.

In this manner, as the print paper 2 is moved lengthwise, rows of dots are printed by a sequence of the exposure operations.

In the development unit 5, the print paper 2, which is exposed at the negative exposure station 3 and/or the line exposure station 4, is subjected to a development process and is cut into frames before being discharged.

The 120 degree rotating action of the disk 13 may be timed by pulses to a stepping motor, action of a rotary encoder, or markings arranged at intervals of 120 degrees.

The conversion data listed in Table 2 may be replaced with the conversion data listed in Table 3 where the duration of voltage application T is determined so that the gray level D is proportional to the intensity of exposure light S. In Table 3, the duration of voltage application T is a nonlinear function of the gray level D. The data in the Tables are set by the conversion data setting means 65.

Although the color density on a photographic material is a nonlinear function of the intensity of exposure light and is not precisely proportional to the gray level in real actions under the conversion data of Table 3, no serious problems would result. The advantage of this conversion table is that it need not be modified for different types of photosensitive material, thus the conversion data setting means 65 would not be required.

The duration of voltage application may be defined by only six different lengths of time; t1, t2, t3, t4, t5, and t6. Then, their combinations are assigned to 32 gray levels; for example, D=13 (=8+4+1) is related to T=t5+t4+t2.

Also, it is preferred to set the durations t1, t2, t3, t4, t5, and t6 independently from each other so that a smoother, more precise gradation is reproduced.

It is noted that the data of the compensated duration of exposure operation not only corresponds to the duration of voltage application when PLZT elements are used as exposure means, but also for situations when other types of exposure means are used.

The exposure means is not limited to the PLZT elements but may also be an exposure means using a liquid crystal shutter. Further, the exposure means is not limited to the one-dimensional arrayed exposure elements but may also be two-dimensional arrayed exposure elements or a system with an exposure head provided with a pair of exposure elements arranged for mechanical scanning actions.

The intensity of light from the light source may be guided to the exposure means by a set of reflector mirrors rather than the optical fibers or the light source itself may be located adjacent to the exposure means.

One example of an exposure means employing a color liquid crystal shutter is an exposure means utilizing techniques in the field of TFT (Thin Film Field Effect Transistor) color liquid crystal. Such an exposure means is described with reference to FIG. 8.

Figure 8:
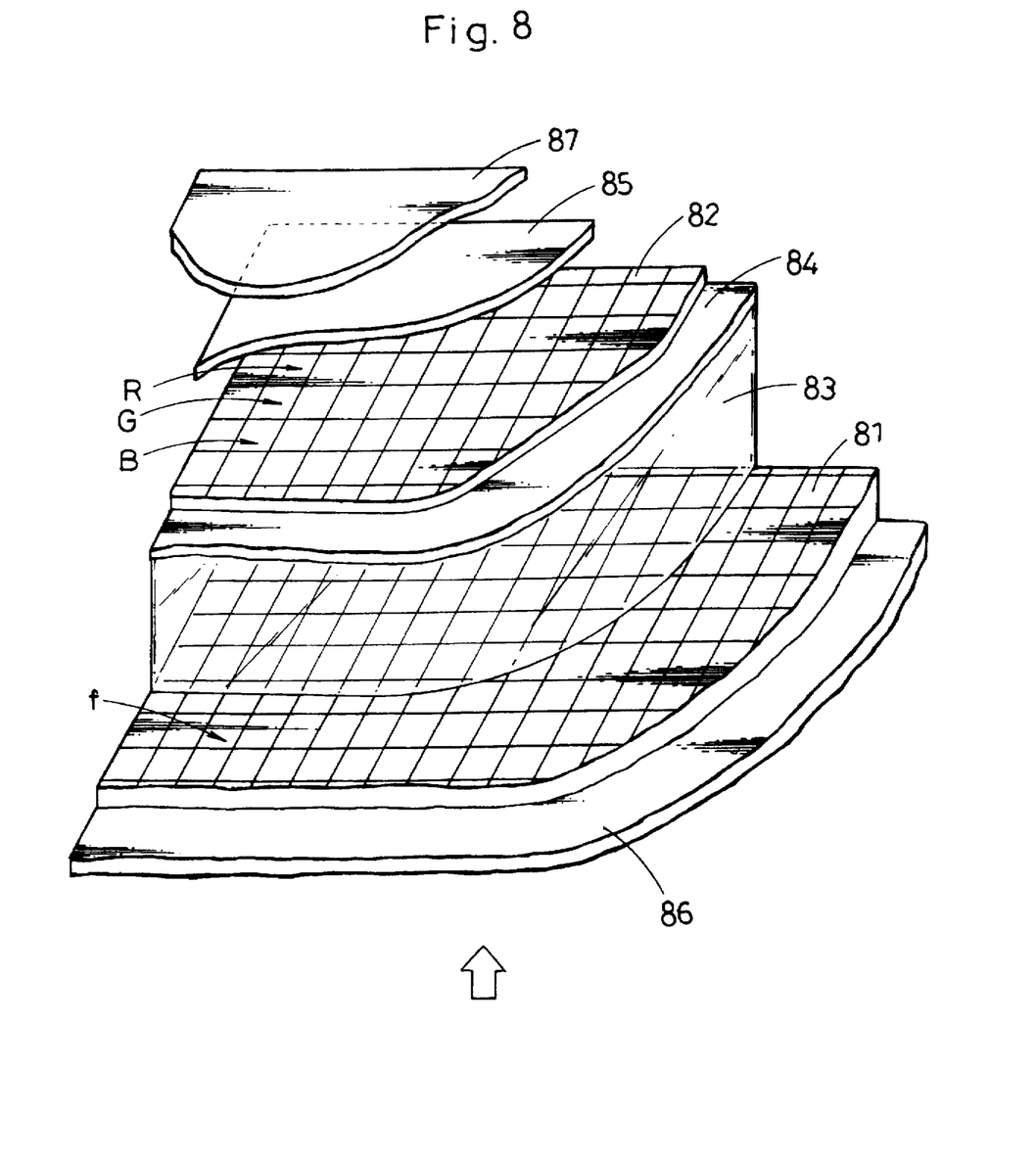
FIG. 8 is a block diagram of a primary part of an exposure means having TFT color liquid crystal.

Amorphous silicium TFT is formed on a glass base by using a process of semiconductor integrated circuit to form a TFT array base 81. Each TFT element f corresponds to a dot to form a transparent electrode driving liquid crystal. Color filter base 82, which is colored into any of R, G, or B according to each dot, faces the TFT array base 81. Transparent common electrode 84 is formed over the entire surface of the color filter base 82. Polarizing plate 85 is provided on the color filter base 82 and a photosensitive material 87 is formed further thereon. Beneath the TFT array base 81, a polarizing plate 86 is provided which is lighted by the light applied by a white light source (not shown).

Once TFT elements f are driven, an electric charge is stored between the dot electrode and the common electrode 84 and the liquid crystal 83 disposed in between them is set up to transfer the light. Thus, a predetermined color is exposed to the photosensitive material 87 corresponding to each color filter.

Although the exposure apparatus of the present invention is described for use in a photographic printer, it is applicable to any photosensitive material to be exposed.

TABLE 1

| gray levels of the data D | duration of voltage application T |
|---|---|
| 0 | 0 |
| 1 | t |
| 2 | 2 × t |
| 4 | 4 × t |
| 8 | 8 × t |
| 16 | 16 × t |
| 31 | 31 × t |

TABLE 2

| gray levels of the data D | duration of voltage application T | intensity of exposure light S | density of a color V |
|---|---|---|---|
| 0 | t 0 = 0 | s 0 = 0 | v 0 = 0 |
| 1 | t 1 = t | s 1 = s | v 1 = v |
| 2 | t 2 ≠ 2 × t | s 2 ≠ 2 × s | v 2 = 2 × v |
| 4 | t 4 ≠ 4 × t | s 4 ≠ 4 × s | v 4 = 4 × v |
| 8 | t 8 ≠ 8 × t | s 8 ≠ 8 × s | v 8 = 8 × v |
| 16 | t 16 ≠ 16 × t | s 16 ≠ 16 × s | v 16 = 16 × v |
| 31 | t 31 ≠ 31 × t | s 31 ≠ 31 × s | v 31 = 31 × v |

TABLE 3

| gray levels of the data D | duration of voltage application T | intensity of exposure light S |
|---|---|---|
| 0 | t 0 = 0 | s 0 = 0 |
| 1 | t 1 = t | s 1 = s |
| 2 | t 2 ≠ 2 × t | s 2 = 2 × s |
| 4 | t 4 ≠ 4 × t | s 4 = 4 × s |
| 8 | t 8 ≠ 8 × t | s 8 = 8 × s |
| 16 | t 16 ≠ 16 × t | s 16 = 16 × s |
| 31 | t 31 ≠ 31 × t | s 31 = 31 × s |

We claim:

1. An exposure apparatus responsive to exposure data for controlling a duration of an exposure operation performed by an exposure device to reproduce gradations on a photosensitive material, comprising:

a converter means for converting the exposure data into compensated exposure data in which the duration of the exposure operation is compensated according to predetermined characteristics, said converter means comprising:

a conversion table containing the compensated exposure data, wherein the exposure data corresponds to the compensated exposure data, respectively, in said conversion table;

a conversion data setting means for setting the compensated exposure data in said conversion table according to the predetermined characteristics; and a reference means for selecting the compensated exposure data from said conversion table in accordance with the exposure data; and an exposure controller means for controlling the duration of the exposure operation of the exposure device according to the compensated exposure data selected by said reference means.

2. An exposure apparatus according to claim 1, wherein said reference means selects a combination of the compensated exposure data from said conversion table in accordance with the exposure data.

3. An exposure apparatus according to claim 1, wherein the predetermined characteristics of said setting means are desired gray levels which are proportional to the exposure data.

4. An exposure apparatus according to claim 1, wherein the predetermined characteristics of said setting means are desired intensities of exposure light which are proportional to the exposure data.

5. An exposure apparatus according to claim 1, wherein the compensated exposure data set in said conversion table includes the exposure data of the duration of the exposure operation with an appropriate delay added for rise and decay times of an exposure light.

* * * * *